United States Patent [19]

Abusleme et al.

[11] Patent Number: 5,498,680
[45] Date of Patent: Mar. 12, 1996

[54] POLYMERIZATION PROCESS IN AQUEOUS EMULSION OF FULUORINATED OLEFINIC MONOMERS

[75] Inventors: Julio A. Abusleme, Saronno; Patrizia Maccone, Milan, both of Italy

[73] Assignee: Ausimont S.p.A., Milan, Italy

[21] Appl. No.: 447,636

[22] Filed: May 23, 1995

Related U.S. Application Data

[63] Continuation of Ser. No. 243,316, May 16, 1994, abandoned.

[30] Foreign Application Priority Data

May 18, 1993 [IT] Italy .................... MI93A1007

[51] Int. Cl.[6] ........................................ C08F 2/00
[52] U.S. Cl. .................... 526/209; 526/206; 526/255
[58] Field of Search ............................. 526/206, 209

[56] References Cited

U.S. PATENT DOCUMENTS

| | | | |
|---|---|---|---|
| 4,451,646 | 5/1984 | Sianesi et al. | |
| 4,789,717 | 12/1988 | Giannetti et al. | 526/209 |
| 4,864,006 | 9/1989 | Giannetti et al. | 526/209 |
| 4,975,502 | 12/1990 | Morita et al. | 526/209 |
| 4,990,283 | 2/1991 | Visca et al. | |
| 5,091,589 | 2/1992 | Meyer et al. | |

*Primary Examiner*—Joseph L. Schofer
*Assistant Examiner*—N. Sarofim
*Attorney, Agent, or Firm*—Stevens, Davis, Miller & Mosher

[57] ABSTRACT

In a process of (co)polymerization in aqueous emulsion of fluorinated olefinic monomers it is added to the reaction medium a microemulsion of fluoropolyoxyalkylenes having hydrogenated end groups and/or hydrogenated repetitive units. A remarkable reduction in the reaction induction period is so obtained, with formation of a product with improved mechanical properties and higher thermal and chemical resistance.

4 Claims, No Drawings

POLYMERIZATION PROCESS IN AQUEOUS EMULSION OF FULUORINATED OLEFINIC MONOMERS

This application is a Continuation of application Ser. No. 08/243,316, filed May 16, 1994, now abandoned.

The present invention relates to a (co)polymerization process in aqueous emulsion of fluorinated olefinic monomers. More particularly the present invention relates to a (co)polymerization process in aqueous emulsion of fluorinated olefinic monomers, in which microemulsions of fluoropolyoxyalkylenes having hydrogenated end groups and/or hydrogenated repetitive units are employed.

It is known that in the (co)polymerization in aqueous emulsion of fluorinated olefinic monomers, the addition of chlorofluorocarbons (CFC) increases the reaction rate (see for instance the patent U.S. Pat. No. 3,635,926).

A remarkable improvement has been obtained by the process described in the patent U.S. Pat. No. 4,864,006, where the fluorinated monomers are (co)polymerized in the presence of perfluoropolyoxyalkylenes prepared in the form of aqueous microemulsion. Besides avoiding the use of CFC, which deplete the ozone layer of the atmosphere, such a process allows to obtain a further increase in the reaction rate, in particular for the least reactive monomers, and a reduction of the working pressure.

The Applicant has now surprisingly found that, in (co)polymerization processes in aqueous emulsion of fluorinated olefinic monomers, by adding to the reaction medium an aqueous microemulsion of a fluoropolyoxyalkylene having hydrogenated end groups and/or hydrogenated repetitive units, it is possible to obtain a remarkable reduction in the induction period compared with the same process carried out in the presence of a microemulsion of perfluoropolyoxyalkylenes. By induction period it is meant the time running from the moment when the addition of the radical initiator begins to the moment when the actual starting of the (co)polymerization is observed, as pointed out by a monomer consumption.

This fact constitutes a remarkable advantage both for the quality of the final product and for the industrial application of the process. In fact, a short induction period minimizes the formation of low molecular weights, which, as known, mainly occurs in the first phase of the reaction, and then leads to a narrower molecular weight distribution. As evidenced by the experiments carried out by the Applicant, the product obtained with the process object of the present invention is also characterized by a lower concentration of end groups deriving from the radical initiator and therefore by a higher thermal stability. Moreover, when operating with a discontinuous process, a lower induction period involves a reduction in the "cycle time", namely the time running from a productive cycle to the other, with evident advantages for a production on an industrial scale.

It is therefore object of the present invention a process of radical (co)polymerization in aqueous emulsion of one or more fluorinated olefinic monomers, optionally in association with one or more non-fluorinated olefins, wherein it is operated in the presence of fluoropolyoxyalkylenes having hydrogenated end groups and/or hydrogenated repetitive units, added to the reaction medium in the form of an aqueous microemulsion.

Such fluoropolyoxyalkylenes are constituted by repetitive units, randomly distributed along the chain, selected from:

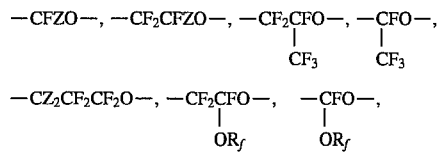

and by hydrogenated end groups selected from $-CF_2H$, $-CF_2CF_2H$, $-CFH-CF_3$, and $-CFH-OR_f$, where $R_f$ is defined as above, or perfluorinated end groups selected from $-CF_3$, $-C_2F_5$ and $-C_3F_7$, at least one of the end groups being hydrogenated.

The average molecular weight is generally comprised between 300 and 4000, preferably between 400 and 1500.

In particular, such fluoropolyoxyalkylenes can be selected from the following classes:

(a) 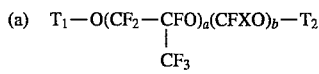

where:

$T_1$ and $T_2$, equal or different from each other, are hydrogenated groups $-CF_2H$, $-CFH-CF_3$, or perfluorinated groups $-CF_3$, $-C_2F_5$, $-C_3F_7$, at least one of the end groups being hydrogenated; X is $-F$ or $-CF_3$; a, b are numbers such that the molecular weight is comprised in the range indicated above, a/b is comprised between 5 and 15;

(b) $T_3-O(CF_2CF_2O)_c(CF_2O)_d-T_4$ where:

$T_3$ and $T_4$, equal or different from each other, are hydrogenated groups $-CF_2H$ or $-CF_2-CF_2H$, or perfluorinated groups $-CF_3$, $-C_2F_5$, at least one of the end groups being hydrogenated; c, d are numbers such that the molecular weight is comprised in the range indicated above, c/d is comprised between 0.3 and 5;

(c) 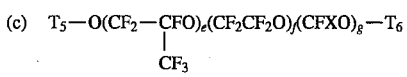

where:

$T_5$ and $T_6$, equal or different from each other, are hydrogenated groups $-CF_2H$, $-CF_2CF_2H$, or $-CFH-CF_3$, or perfluorinated groups $-CF_3$, $-C_2F_5$, $-C_3F_7$, at least one of the end groups being hydrogenated; X is $-F$ or $-CF_3$; e, f, g are numbers such that the molecular weight is comprised in the range indicated above, e/(f+g) is comprised between 1 and 10, f/g is comprised between 1 and 10;

(d) 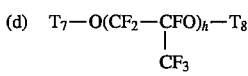

where:

$T_7$ and $T_8$ are hydrogenated groups $-CFH-CF_3$, or perfluorinated groups $-C_2F_5$, $-C_3F_7$, at least one of the end groups being hydrogenated; h is a number such that the molecular weight is comprised in the range indicated above;

(e) $T_9-O(CZ_2CF_2CF_2O)_i-T_{10}$ where:

Z is F or H; $T_9$ and $T_{10}$, equal or different from each other, are hydrogenated groups $-CF_2H$ or $-CF_2CF_2H$, or perfluorinated groups $-CF_3$, —$C_2F_5$, —$C_3F_7$, at least one of the end groups being hydrogenated; i is a number such that the molecular weight is comprised in the range indicated above;

(f) 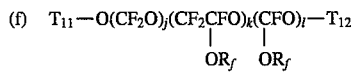

where:

$R_f$ is —$CF_3$, —$C_2F_5$, or —$C_3F_7$; $T_{11}$ and $T_{12}$, equal or different from each other, are hydrogenated groups —$CF_2H$, —$CF_2CF_2H$, —CFH—$OR_f$, or perfluorinated groups —$CF_3$, —$C_2F_5$, —$C_3F_7$, at least one of the end groups being hydrogenated; j, k, l are numbers such that the molecular weight is comprised in the range indicated above, k+l and j+k+l are at least equal to 2, k/(j+l) is comprised between $10^{-2}$ and $10^3$, l/j is comprised between $10^{-2}$ and $10^2$;

(g) 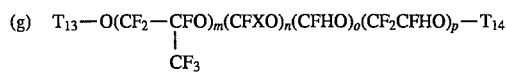

where:

$T_{13}$ and $T_{14}$, equal or different from each other, are hydrogenated groups —$CF_2H$, —CFH—$CF_3$, or perfluorinated groups —$CF_3$, —$C_2F_5$, —$C_3F_7$, at least one of the end groups being hydrogenated; X is —F or —$CF_3$; m, n, o, p are numbers such that the molecular weight is comprised in the range indicated above, m/n is comprised between 5 and 40, m/(o+p) is comprised between 2 and 50, o+p is at least 3, o is lower than p;

(h) 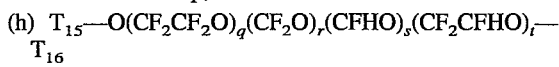

where:

$T_{15}$ and $T_{16}$, equal or different from each other, are hydrogenated groups —$CF_2H$, —$CF_2$—$CF_2H$, or perfluorinated groups —$CF_3$, —$C_2F_5$, at least one of the end groups being hydrogenated; q, r, s, t are numbers such that the molecular weight is comprised in the range indicated above, q/r is comprised between 0.5 and 2, (q+r)/(s+t) is comprised between 3 and 40, s+t is at least 3, s is lower than t;

(i) 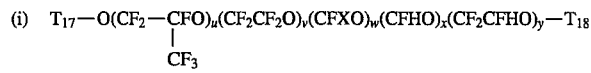

where:

$T_{17}$ and $T_{18}$, equal or different from each other, are hydrogenated groups —$CF_2H$, —$CF_2CF_2H$, —CFH—$CF_3$, or perfluorinated groups —$CF_3$, —$C_2F_5$, —$C_3F_7$, at least one of the end groups being hydrogenated: X is —F or —$CF_3$; u, v, w, x, y are numbers such that the molecular weight is comprised in the range indicated above, (u+v)/w is comprised between 5 and 40, (u+v)/(x+y) is comprised between 2 and 50, x+y is at least 3, x is lower than y.

They are products obtainable by hydrolysis and subsequent decarboxylation of the —COF groups present in the corresponding perfluoropolyoxyalkylenes, as described for instance in the patents EP-154,297, U.S. Pat. No. 4,451,646 and U.S. Pat. No. 5,091,589.

The starting perfluoropolyethers containing the —COF groups as end groups and/or along the chain are described, for instance, in the patents GB-1,104,482 (class (a)), U.S. Pat. No. 3,715,378 (class (b)), U.S. Pat. No. 3,242,218 (class (c)), U.S. Pat. No. 3,242,218 (class (d)), EP-148,482 (class (e)), EP-445,738 (class (f)), EP-244,839 and EP-337,346 (classes (g), (h), (i)).

Analogously to the microemulsions of perfluoropolyoxyalkylenes described in the patent U.S. Pat. No. 4,990,283, which is herein incorporated by reference, by aqueous microemulsion of fluoropolyoxyalkylenes having hydrogenated end groups and/or hydrogenated repetitive units it is meant a microemulsion of the oil-in-water or water-in-oil type, macroscopically formed by a sole liquid phase having a limpid or opalescent appearance, stable in a certain temperature range, comprising:

(a) an aqueous solution;

(b) a fluoropolyoxyalkylene having hydrogenated end groups and/or hydrogenated repetitive units, as above defined;

(c) a fluorinated surfactant.

Said microemulsions can also contain co-surfactants, such as low chain ($C_1$–$C_6$) hydrogenated or fluorinated alcohols. Salts soluble in water can also be added, in order to increase the ionic strength of the aqueous phase and to modify the interface tension between the immiscible liquids.

The fluorinated surfactant can be either of the ionic or of the non-ionic type, and can be selected from the following classes: perfluorocarboxylic or perfluorosulphonic acids $C_5$–$C_{11}$ and salts thereof; non-ionic surfactants disclosed in the patent application EP-51,526; mono- or bicarboxylic acids deriving from perfluoropolyoxyalkylenes and salts thereof; non-ionic surfactants formed by a perfluoropolyoxyalkylene chain bound to a polyoxyalkylene chain; cationic surfactants having one or more perfluoroalkyl and/or perfluoropolyoxyalkylene chains; etc.

The preparation of the microemulsions is performed by simply mixing the components, without the need of supplying the system with a remarkable dispersion energy, as it occurs, on the contrary, in the case of conventional emulsions.

According to the experiments carried out by the Applicant, the replacement of a perfluoropolyoxyalkylene with a fluoropolyoxyalkylene having hydrogenated end groups and/or hydrogenated repetitive units as oil phase does not involve substantial modifications of the criteria reported in the above patent U.S. Pat. No. 4,990,283 to lead the skilled person in the formulation of the microemulsions. Of course, under the same conditions, the presence of hydrogenated end groups and/or hydrogenated repetitive units involves a different affinity with respect to the other components, whereby it is often necessary to slightly modify the concentration of the components with respect to the corresponding perfluoropolyoxyalkylene microemulsions. However, for the skilled person it is sufficient to carry out some tests in order to find the proper combination of parameters which allow to obtain the desired microemulsion.

As well known in the art, the (co)polymerization reaction occurs in the presence of suitable initiators, such as inorganic peroxides (for instance, ammonium or alkali metal persulphates) or organic peroxides (for instance, disuccinylperoxide, terbutyl-hydroperoxide, diterbutylperoxide), or also azocompounds (see U.S. Pat. No. 2,515,628 and U.S. Pat. No. 2,520,338). It is also possible to employ organic or inorganic redox systems, such as ammonium persulphate/sodium sulphite, hydrogen peroxide/aminoimimomethansulphinic acid.

The amount of radical initiator is that usually employed for the (co)polymerization of fluorinated olefinic monomers, and it is generally comprised between 0.003% and 5% by weight with respect to the total amount of (co)polymerized monomers.

It is important to point out that the use of fluoropolyoxyalkylenes having hydrogenated end groups and/or hydrogenated repetitive units instead of the corresponding perfluoropolyoxyalkylenes allows a greater flexibility in the selection of the initiator, since the presence of hydrogenated end groups increases the affinity with nonfluorinated products. Particularly, in the process object of the present invention it is possible to employ hydrogenated organic peroxides insoluble in water and in perfluoropolyoxyalkylenes, such as for example bis-(4-t-butylcyclohexyl) peroxydicarbonate.

As known, the emulsion technique requires also the presence of surfactants to stabilize the polymer particles in the latex. Since the surfactants used in the fluoropolyoxyalkylenes microemulsion are of the same kind of those commonly used in this kind of (co)polymerizations, generally it is not necessary to add other surfactants, the amount present in the microemulsion being per se sufficient to the purpose. If this situation does not occur, it is always possible to add other surfactants, which can be selected from the products having the formula:

$$R_f\text{—}X^-\ M^+$$

where $R_f$ is a (per)fluoroalkyl chain $C_5$–$C_{16}$ or a (per)fluoropolyoxyalkylene chain, $X^-$ is —COO$^-$ or —SO$_3^-$, $M^+$ is selected from: $H^+$, $NH_4^+$, alkali metal ion. Among those most commonly used we cite: ammonium perfluoro-octanoate, (per)fluoropolyoxyalkylenes terminated with one or more carboxylic groups, etc.

The reaction temperature can vary within a wide range, generally comprised between 10° and 150° C., preferably between 50° and 80° C., while the pressure is generally comprised between 1 and 10 MPa, preferably between 1.5 and 4 MPa.

The process object of the present invention can be employed with all kinds of fluorinated olefinic monomers, optionally containing hydrogen and/or chlorine and/or bromine and/or iodine and/or oxygen, provided that they are able to give (co)polymers by reaction with radical initiators in aqueous emulsion. Among them we can cite: perfluoroolefins $C_2$–$C_8$, such as tetrafluoroethylene (TFE), hexafluoropropene (HFP), hexafluoroisobutene; hydrogenated fluoroolefins $C_2$–$C_8$, such as vinylfluoride (VF), vinylidene fluoride (VDF), trifluoroethylene, perfluoroalkylethylenes $CH_2=CH\text{—}R_f$, where $R_f$ is a perfluoroalkyl $C_1$–$C_6$; chloro- and/or bromo- and/or iodo-fluoroolefins $C_2$–$C_8$, such as chlorotrifluoroethylene (CTFE) and bromotrifluoroethylene; (per)fluorovinylethers $CF_2=CFOX$, where X is a (per)fluoroalkyl $C_1$–$C_6$, for instance trifluoromethyl, pentafluoropropyl, bromodifluoromethyl, or a perfluorooxyalkyl $C_1$–$C_9$ having one or more ether groups, for instance perfluoro-2-propoxypropyl; perfluorodioxols.

The fluoroolefins can also be copolymerized with nonfluorinated olefins $C_2$–$C_8$, such as ethylene, propylene, isobutylene.

Among the polymers to which the process object of the present is applicable, there are particularly comprised:

(a) "modified" polytetrafluoroethylene, containing small amounts, generally comprised between 0.1 and 3% by mols, preferably lower than 0.5% by mols, of one or more comonomers such as, for instance: perfluoropropene, perfluoroalkylvinylethers, vinylidene fluoride, hexafluoroisobutene, chlorotrifluoroethylene, perfluoroalkylethylenes;

(b) TFE thermoplastic polymers containing from 0.5 to 8% by mols of at least a perfluoroalkylvinylether, where the alkyl has from 1 to 6 carbon atoms, such as, for instance, TFE/perfluoropropylvinylether, TFE/perfluoromethylvinylether, TFE/perfluoroalkylethylene copolymers;

(c) TFE thermoplastic polymers containing from 2 to 20% by mols of a perfluoroolefin $C_3$–$C_8$, such as, for instance, FEP (TFE/HFP copolymer), to which other comonomers having vinylether structure (see for instance the patent U.S. Pat. No. 4,675,380), can be added in small amounts (lower than 5% by mols);

(d) TFE or CTFE copolymers with ethylene, propylene or isobutylene, optionally containing a third fluorinated comonomer in amounts comprised between 0.1 and 10% by mols (see for instance the patents U.S. Pat. No. 3,624,250 and U.S. Pat. No. 4,513,129);

(e) TFE elastomeric copolymers with a perfluoroalkylvinylether or a perfluorooxyalkylvinylether, optionally containing propylene or ethylene, besides lower amounts of a "cure-site" monomer (see for instance the patents U.S. Pat. No. 3,467,635 and U.S. Pat. No. 4,694,045);

(f) polymers having dielectric characteristics, comprising 60–79% by mols of VDF, 18–22% by mols of trifluoroethylene and 3–22% by mols of CTFE (see the patent U.S. Pat. No. 5,087,679);

(g) VDF elastomeric polymers, such as VDF/HFP copolymers and VDF/HFP/TFE terpolymers (see, for instance, the patent GB-888.765 and Kirk-Othmer, "Encyclopedia of Chemical Technology", Vol. 8, pag. 500–515—1979); such polymers can also contain: hydrogenated olefins, such as ethylene and propylene (as described for instance in EP-518,073); perfluoroalkylvinylethers; brominated "cure-site" comonomers and/or terminal iodine atoms, as described, for instance, in U.S. Pat. No. 4,243,770, U.S. Pat. No. 4,973,633 and EP-407,937;

(h) polyvinylidene fluoride or modified polyvinylidene fluoride containing little amounts, generally comprised between 0.1 and 10% by mols, of one or more fluorinated comonomers, such as hexafluoropropene, tetrafluoroethylene, trifluoroethylene.

The polymers of the classes indicated above, and in particular the polymers based on TFE, can be modified with perfluorinated dioxols, as described for instance in the patents U.S. Pat. No. 3,865,845, U.S. Pat. No. 3,978,030, EP-73,087, EP-76,581, EP-80,187.

Some working examples are hereinunder reported, whose aim is merely illustrative but not limitative of the scope of the invention itself.

EXAMPLE 1

Preparation of the Fluoropolyoxyalkylene Microemulsion Having Hydrogenated End Groups In a glass flask equipped with a stirrer, 26.1 g of demineralized $H_2O$, 20.0 g of a surfactant of the formula:

$$CF_3O(CF_2CF(CF_3)O)_m(CF_2O)_nCF_2COO^-K^+$$

having a m/n ratio= 26.2 and an average molecular weight of about 580, and 14.5 g of a fluoropolyoxyalkylene having the formula:

having a m/n ratio= 0.95 and an average molecular weight of 365, were added. At a temperature comprised between 14.7 and 39° C. the mixture is the form of microemulsion, and it appears as a limpid, thermodynamically stable solution.

Copolymerization of Tetrafluoroethylene and Ethylene

A 5 l AISI 316 steel chromium-plated autoclave, equipped with a stirrer working at 570 rpm, was evacuated and 3.5 l of demineralized $H_2O$; 60.6 g of the fluoropolyoxyalkylene microemulsion having hydrogenated end groups previously prepared, corresponding to 20.0 g of surfactant, were added in sequence.

The autoclave was then brought to the reaction temperature of 60° C. and loaded with an ethylene/TFE gaseous mixture in such an amount to obtain, at the working pressure of 22 absolute bar, an ethylene/TFE ratio in the gas phase of about 20/80 by mols. The pressure was maintained constant during the reaction by feeding an ethylene/TFE mixture with a ratio 49/51 by mols. When the working pressure was reached, ammonium persulphate (APS), in the form of an aqueous solution, was fed continuously for 2 hours with a flow rate of $3 \cdot 10^{-3}$ g/l·min.

Taking as reference the moment in which the introduction of the initiator began, the reaction started after 10 minutes; after 195 minutes the reaction was stopped by cooling the autoclave at room temperature. The so obtained latex was then discharged, coagulated by mechanical stirring, washed with $H_2O$ and dried. 928 g of a copolymer ethylene/TFE were obtained. The values of productivity ($R_p$) are reported in Table 1, expressed as grams of produced polymer per minute per $H_2O$ liter.

EXAMPLE 2 (comparative)

Preparation of the Perfluoropolyoxyalkylene Microemulsion

In a glass flask equipped with a stirrer, 20.0 g of the surfactant of the formula:

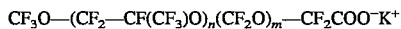

having n/m= 10 and average molecular weight of 580, 18.0 g of demineralized water and 12.0 g of Galden$^{(R)}$ DO2, of the formula:

having n/m=20 and average molecular weight of 450, were mixed. At a temperature comprised between 0° and 55° C. the mixture is in the form of a microemulsion and appears as a limpid solution.

Copolymerization of Tetrafluoroethylene and Ethylene

Example 1 was repeated in the same conditions, using an amount of the perfluoropolyoxyalkylene microemulsion previously prepared such as to obtain 20.0 g of surfactant. By taking as zero time the time when the addition of the initiator began, the reaction started after 52 minutes; after 233 minutes the reaction was stopped and 934 g of a copolymer ethylene/TFE were obtained. The measured values of productivity ($R_p$) are reported in Table 1.

EXAMPLE 3

A 5 l AISI 316 steel chromium-plated autoclave, equipped with a stirrer working at 570 rpm, was evacuated, and 3.4 l of demineralized $H_2O$; 60.6 g of the fluoropolyoxyalkylene microemulsion having hydrogenated end groups of Example 1, corresponding to 20.0 g of surfactant; 64 g of terbutanol; 3 g of n-pentane as chain transfer agent, were introduced in sequence.

The autoclave was then brought to the reaction temperature of 60° C. and charged with an ethylene/TFE gaseous mixture in such an amount to obtain, at the working pressure of 22 absolute bar, an ethylene/TFE ratio in the gas phase of about 20/80 by mols. The pressure was kept constant during the raction by feeding an ethylene/TFE mixture in a molar ratio 49/51. When the working pressure was reached, ammonium persulphate (APS), in the form of aqueous solution, was continuously fed for 2 hours with a flow rate of $3 \cdot 10^{-3}$ g/l·min. Taking as zero time the time when the addition of the initiator began, the reaction started after 26 minutes; after 223 minutes the reaction was stopped by cooling the autoclave at room temperature. The so obtained latex was discharged, coagulated by mechanical stirring, washed with $H_2O$ and dried. 310 g of an ethylene/TFE copolymer was obtained. The values of the Melt Flow Index (MFI) (according to ASTM Method D 3159-83) and of the radical concentration, expressed as grams of $SO_4^-·$ radicals produced during the reaction per polymer gram, are reported in Table 2.

From the so obtained copolymer a film having a thickness of 0.4 mm was molded, which was then submitted to aging in air at 235° C. for 144, 264 and 360 hours. The sample was analyzed at FT-IR in the absorption range corresponding to the double bonds (1800–1650 cm$^{-1}$), which form as a consequence of the degradation of the product. The values of the area of the absorption band in said range ($A_t$) are reported, measured at the different times of aging, to which the area of the band at zero time (A0) was subtracted.

EXAMPLE 4 (comparative)

Example 3 was repeated in the same conditions, using an amount of the perfluoropolyoxyalkylene microemulsion of Example 2 such as to obtain 20.0 g of surfactant. By taking as zero time the moment when the addition of the initiator began, the reaction started after 42 minutes; after 266 minutes the reaction was stopped and 310 g of an ethylene/TFE copolymer were obtained. The values of the MFI and of the radical concentration, measured as described in Example 3, are reported in Table 2.

From the so obtained copolymer a film having a thickness of 0.4 mm was molded, whose thermal stability was tested according to the method described in Example 3. The so obtained data are reported in Table 2.

TABLE 1

| EX. | INDUCTION PERIOD (min) | REACTION TIME (min) | OBTAINED POLYMER (g) | $R_p$ ($g/l_{H_2O}$/min) | RADICAL CONC. (rad.g./pol.g.) |
| --- | --- | --- | --- | --- | --- |
| 1 | 10 | 195 | 928 | 1.36 | $4.81 \cdot 10^{-5}$ |
| 2(*) | 52 | 233 | 934 | 1.14 | $6.09 \cdot 10^{-5}$ |

(*)comparative

TABLE 2

| | | | AGEING AT 235° C. $(A_t - A_0)$ (optical density units · cm$^{-1}$) | | |
| --- | --- | --- | --- | --- | --- |
| EX. | MFI (g/10') | RADICAL CONC. (rad.g./pol.g.) | 144 h | 264 h | 360 h |
| 3 | 4.1 | $1.73 \cdot 10^{-4}$ | 2.6 | 4.3 | 5.7 |
| 4(*) | 6.9 | $2.18 \cdot 10^{-4}$ | 3.0 | 5.4 | 6.4 |

(*)comparative

We claim:

1. A process of radical (co)polymerization in an aqueous emulsion of one or more fluorinated olefinic monomers, optionally in association with one or more non-fluorinated olefins, wherein said process is operated in the presence of fluoropolyoxyalkylenes having hydrogenated end groups and/or hydrogenated repetitive units added to the reaction medium in the form of an aqueous microemulsion, said fluoropolyoxyalkylenes comprising repetitive units, randomly distributed along the chain, selected from the group consisting of $$-CFZO-, -CF_2CFZO-, -CF_2CFO-, -CFO-,$$
$$\qquad\qquad\qquad\qquad\quad\; |\qquad\quad\;\; |$$
$$\qquad\qquad\qquad\qquad\; CF_3\qquad CF_3$$

$$-CZ_2CF_2CF_2O-, -CF_2CFO-\quad -CFO-,$$
$$\qquad\qquad\qquad\qquad\quad\;\; |\qquad\qquad\; |$$
$$\qquad\qquad\qquad\qquad\; OR_f\qquad\quad OR_f$$

and by hydrogenated end groups selected from the group consisting of $-CF_2H$, $-CF_2CF_2H$, $-CFH-CF_3$, and $-CFH-OR_f$, where $R_f$ is defined as above, or perfluorinated end groups selected from the group consisting of $-CF_3$, $-C_2F_5$ and $-C_3F_7$, at least one of the end groups being hydrogenated.

2. Process according to claim 1, wherein the average molecular weight of the fluoropolyoxyalkylenes is comprised between 300 and 4000.

3. Process according to claim 2, wherein the average molecular weight of the fluoropolyoxyalkylenes is comprised between 400 and 1500.

4. Process according to claims 1, 2 or 3, wherein the fluoropolyoxyalkylenes are selected from the following classes:

(a) $T_1-O(CF_2-CFO)_a(CFXO)_b-T_2$
$\qquad\qquad\qquad\quad\; |$
$\qquad\qquad\qquad CF_3$ where:

$T_1$ and $T_2$, equal or different from each other, are hydrogenated groups $-CF_2H$, $-CFH-CF_3$, or perfluorinated groups $-CF_3$, $-C_2F_5$, $-C_3F_7$, at least one of the end groups being hydrogenated; X is $-F$ or $-CF_3$; a, b are numbers such that the molecular weight is comprised in the range indicated above, a/b is comprised between 5 and 15;

(b) $T_3-O(CF_2CF_2O)_c(CF_2O)_d-T_4$ where:

$T_3$ and $T_4$, equal or different from each other, are hydrogenated groups $-CF_2H$ or $-CF_2-CF_2H$, or perfluorinated groups $-CF_3$, $-C_2F_5$, at least one of the end groups being hydrogenated; c, d are numbers such that the molecular weight is comprised in the range indicated above, c/d is comprised between 0.3 and 5;

(c) $T_5-O(CF_2-CFO)_e(CF_2CF_2O)_f(CFXO)_g-T_6$
$\qquad\qquad\qquad\quad\; |$
$\qquad\qquad\qquad CF_3$ where:

$T_5$ and $T_6$, equal or different from each other, are hydrogenated groups $-CF_2H$, $-CF_2CF_2H$, or $-CFH-CF_3$, or perfluorinated groups $-CF_3$, $-C_2F_5$, $-C_3F_7$, at least one of the end groups being hydrogenated; X is $-F$ or $-CF_3$; e, f, g are numbers such that the molecular weight is comprised in the range indicated above, e/(f+g) is comprised between 1 and 10, f/g is comprised between 1 and 10;

(d) $T_7-O(CF_2-CFO)_h-T_8$
$\qquad\qquad\qquad\; |$
$\qquad\qquad\; CF_3$ where:

$T_7$ and $T_8$ are hydrogenated groups $-CFH-CF_3$, or perfluorinated groups $-C_2F_5$, $-C_3F_7$, at least one of the end groups being hydrogenated; h is a number such that the molecular weight is comprised in the range indicated above;

(e) $T_9-O(CZ_2CF_2CF_2O)_i-T_{10}$ where:

Z is F or H; $T_9$ and $T_{10}$, equal or different from each other, are hydrogenated groups $-CF_2H$ or $-CF_2-CF_2H$, or perfluorinated groups $-CF_3$, $-C_2F_5$, $-C_3F_7$, at least one of the end groups being hydrogenated; i is a number such that the molecular weight is comprised in the range indicated above;

(f) $T_{11}-O(CF_2O)_j(CF_2CFO)_k(CFO)_l-T_{12}$
$\qquad\qquad\qquad\qquad\qquad\;\; |\qquad\quad\; |$
$\qquad\qquad\qquad\qquad\quad\; OR_f\qquad OR_f$ where:

$R_f$ is $-CF_3$, $-C_2F_5$, or $-C_3F_7$; $T_{11}$ and $T_{12}$, equal or different from each other, are hydrogenated groups $-CF_2H$, $-CF_2CF_2H$, $-CFH-OR_f$, or perfluorinated groups $-CF_3$, $-C_2F_5$, $-C_3F_7$, at least one of the end groups being hydrogenated; j, k, l are numbers such that the molecular weight is comprised in the range indicated above, k+l and j+k+l are at least equal to 2, k/(j+l) is comprised between $10^{-2}$ and $10^3$, l/j is comprised between $10^{-2}$ and $10^2$;

(g) 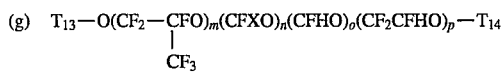

where:
$T_{13}$ and $T_{14}$, equal or different from each other, are hydrogenated groups —$CF_2H$, —CFH—$CF_3$, or perfluorinated groups —$CF_3$, —$C_2F_5$, —$C_3F_7$, at least one of the end groups being hydrogenated; X is —F or —$CF_3$; m, n, o, p are numbers such that the molecular weight is comprised in the range indicated above, m/n is comprised between 5 and 40, m/(o+p) is comprised between 2 and 50, o+p is at least 3, o is lower than p;

(h) $T_{15}$—O$(CF_2CF_2O)_q(CF_2O)_r(CFHO)_s(CF_2CFHO)_t$—$T_{16}$ where:
$T_{15}$ and $T_{16}$, equal or different from each other, are hydrogenated groups —$CF_2H$, —$CF_2$—$CF_2H$, or perfluorinated groups —$CF_3$, —$C_2F_5$, at least one of the end groups being hydrogenated; q, r, s, t are numbers such that the molecular weight is comprised in the range indicated above, q/r is comprised between 0.5 and 2, (q+r)/(s+t) is comprised between 3 and 40, s+t is at least 3, s is lower than t;

(i) 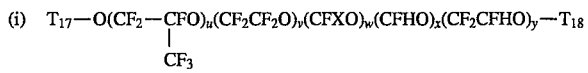

where:
$T_{17}$ and $T_{18}$, equal or different from each other, are hydrogenated groups —$CF_2H$, —$CF_2CF_2H$, —CFH—$CF_3$, or perfluorinated groups —$CF_3$, —$C_2F_5$, —$C_3F_7$, at least one of the end groups being hydrogenated; X is —F or —$CF_3$; u, v, w, x, y are numbers such that the molecular weight is comprised in the range indicated above, (u+v)/w is comprised between 5 and 40, (u+v)/(x+y) is comprised between 2 and 50, x+y is at least 3, x is lower than y.

* * * * *